(12) United States Patent
Norton

(10) Patent No.: US 11,407,342 B1
(45) Date of Patent: Aug. 9, 2022

(54) SEAT BACK ENERGY ABSORBER

(71) Applicant: Zoox, Inc., Foster City, CA (US)

(72) Inventor: Thomas William Norton, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/917,079

(22) Filed: Jun. 30, 2020

(51) Int. Cl.
*B60N 2/427* (2006.01)
*B60N 2/64* (2006.01)
*B60N 2/42* (2006.01)
*B60N 2/01* (2006.01)

(52) U.S. Cl.
CPC ....... *B60N 2/42745* (2013.01); *B60N 2/4214* (2013.01); *B60N 2/64* (2013.01); *B60N 2/01* (2013.01)

(58) Field of Classification Search
CPC ..... B60N 2/42745; B60N 2/4214; B60N 2/64
USPC ................................................... 297/216.13
See application file for complete search history.

(56) References Cited

U.S. PATENT DOCUMENTS

| 6,062,642 | A | * | 5/2000 | Sinnhuber | ............ | B60N 2/4228 |
| | | | | | | 297/216.1 X |
| 7,021,706 | B2 | | 4/2006 | Aufrere et al. | | |
| 9,409,539 | B2 | * | 8/2016 | Nagasawa | ............ | B60N 2/6009 |
| 2015/0091281 | A1 | | 4/2015 | Nagasawa | | |
| 2015/0232053 | A1 | * | 8/2015 | Cormier | ................... | B60N 2/70 |
| | | | | | | 280/751 |

FOREIGN PATENT DOCUMENTS

JP         10119616 A  *  5/1998

* cited by examiner

*Primary Examiner* — Anthony D Barfield
(74) *Attorney, Agent, or Firm* — Lee & Hayes, P.C.

(57) ABSTRACT

An energy absorber for the seat of a vehicle is designed to reduce the risk of injury to an occupant in the event of an abrupt movement or a collision involving a rear-facing passenger. The energy absorber may be disposed within a vehicle seat and may contain one or more crushable elements and/or pelvic support structures designed to minimize the impact of the collision on the rear-facing passenger. The energy absorber may contain one or more materials that plastically deform under a force imparted on the seat by the occupant accelerating relative to and toward the seat during the collision, while limiting or restricting deflection of the crushable elements in a lateral or vertical direction.

20 Claims, 8 Drawing Sheets

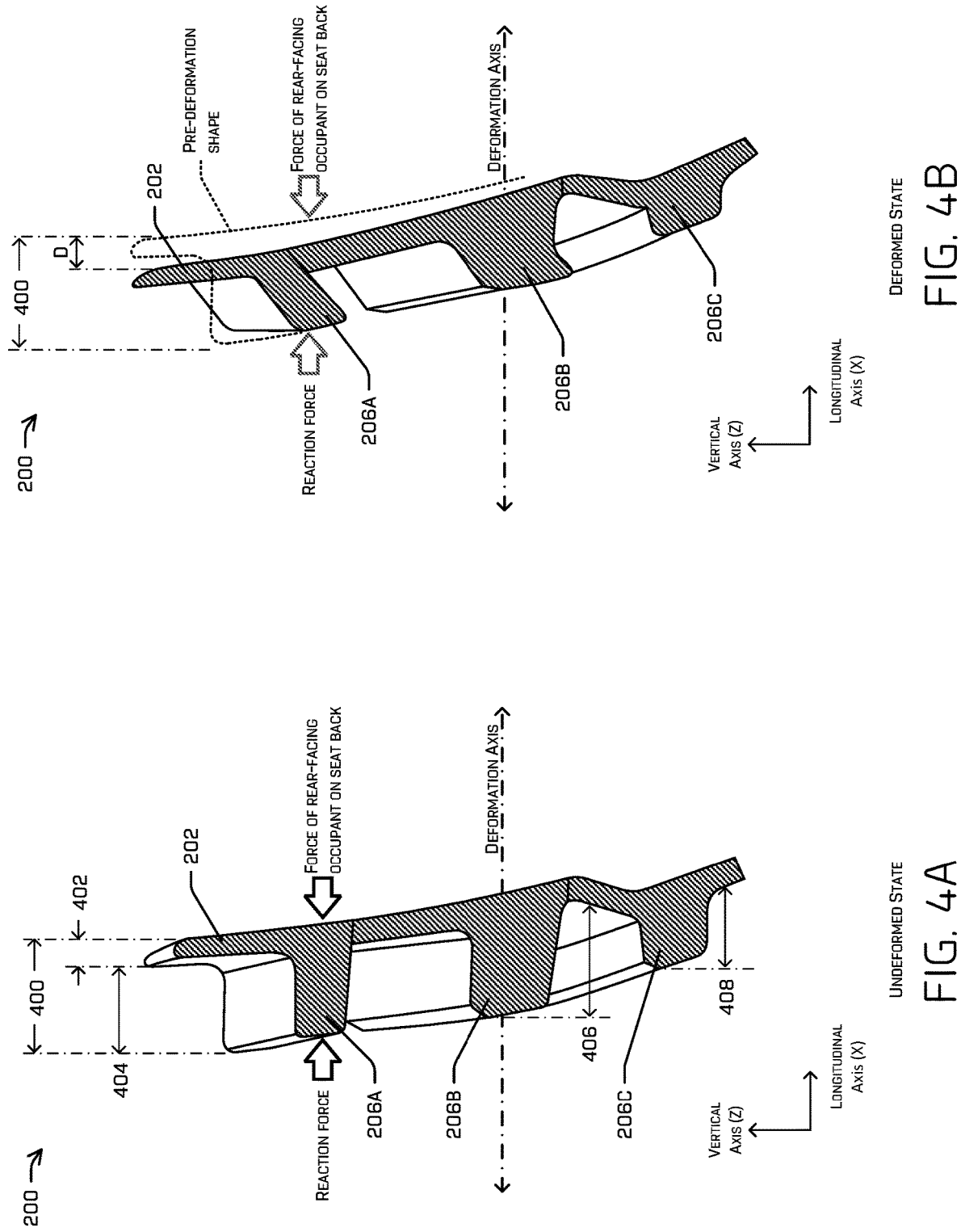

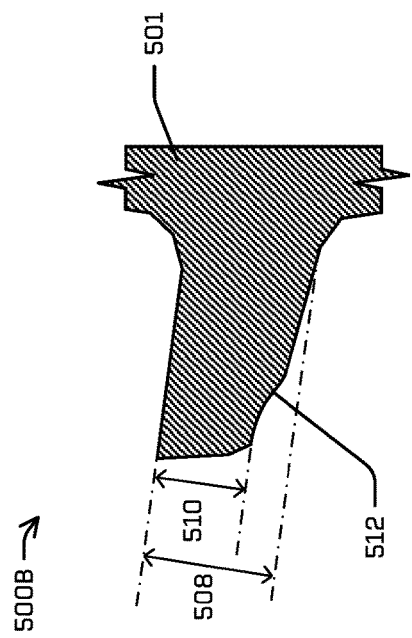
FIG. 5A
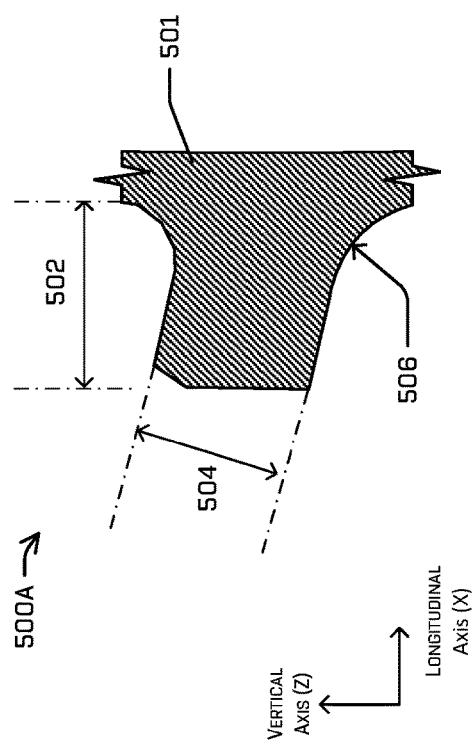
FIG. 5B
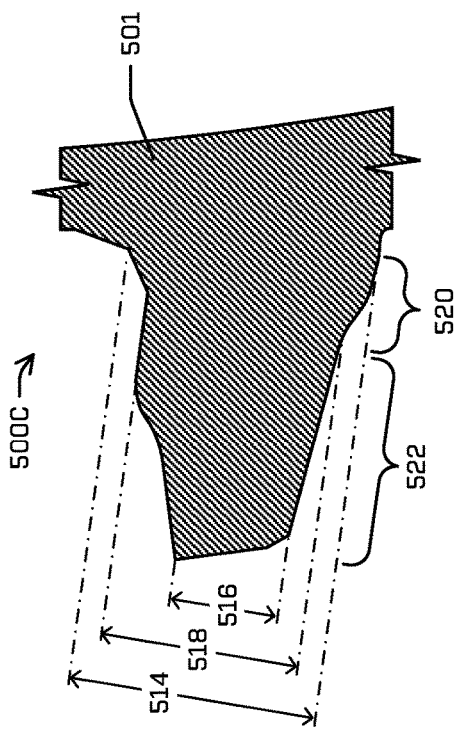
FIG. 5C
FIG. 5D

SEAT BACK ENERGY ABSORBER

BACKGROUND

In a traditional vehicle, where all occupants face in the direction of a vehicle's forward motion, various safety features protect an occupant during the event of an abrupt movement or collision involving the vehicle. For example, during vehicle collision, a seatbelt may be the primary safety feature to protect a forward-facing occupant from injury or harm. Airbags may also be provided to help protect occupants during a collision. However, in a vehicle with a carriage seating configuration where occupants face one another with some occupants facing forward and some facing rearward, traditional safety features may not adequately protect occupants during certain types of impact or collisions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4A illustrates a cross-sectional view of the energy absorber of FIG. 2 taken along line 4-4 in FIG. 3 in an undeformed state.

FIG. 4B illustrates a cross-sectional view of the energy absorber of FIG. 4A in a deformed state (e.g., during or after a collision).

FIGS. 5A-5D illustrate cross-sectional views of the example chevron-shaped crushable elements of the energy absorber of FIG. 2.

DETAILED DESCRIPTION

Figure 1:
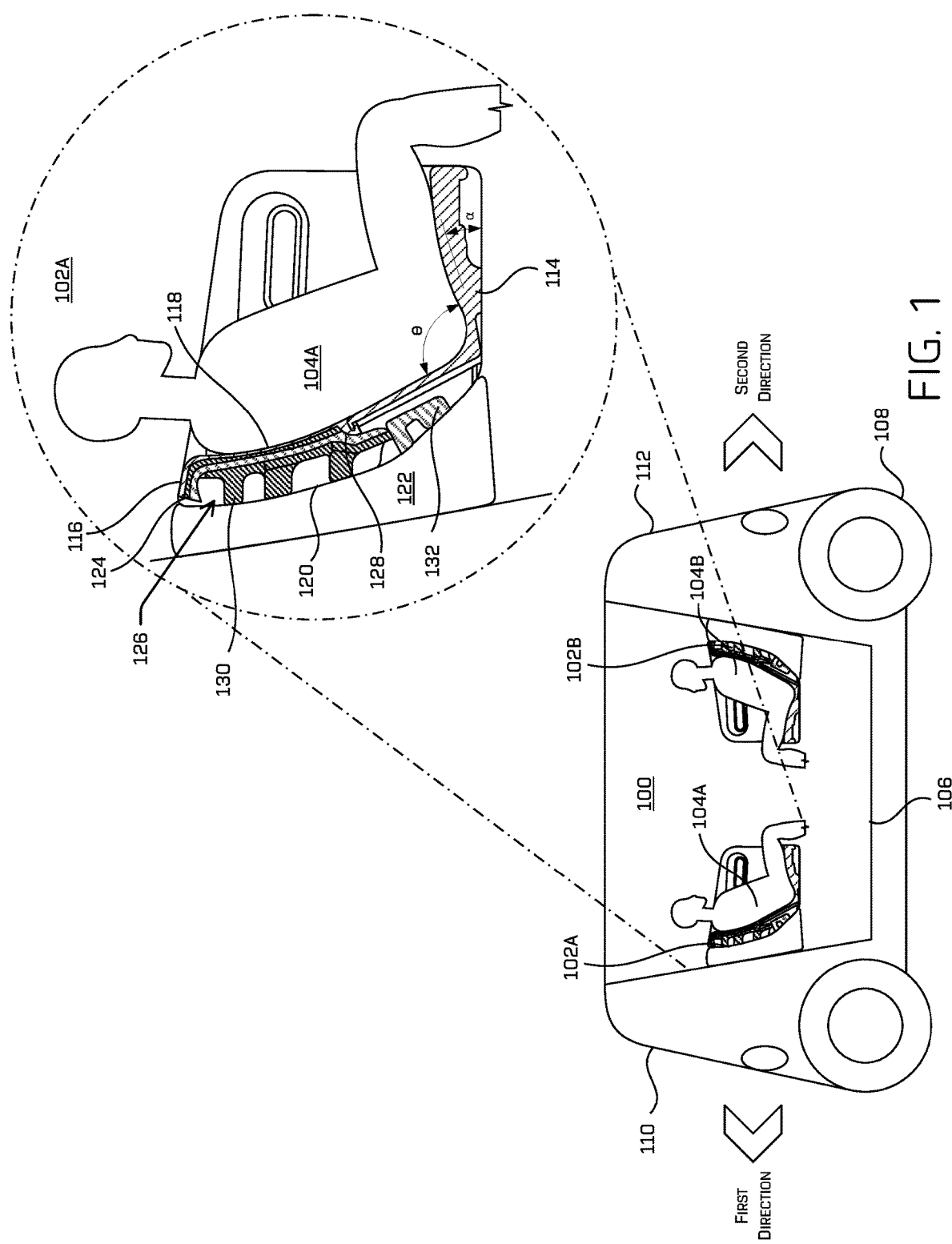
FIG. 1 illustrates a schematic view of an example vehicle having a passenger compartment with seats arranged facing one another, in accordance with embodiments of this disclosure. Example energy absorbers are located within the seats to absorb energy during a collision.

As discussed above, traditional safety features may not adequately protect rear-facing occupants in a vehicle with a carriage seating configuration. This application relates to an energy absorber comprising a crush structure disposed in a seat back to absorb energy of the occupant during a collision. The crush structure may comprise one or more crushable elements(s) protruding from a sheet or backplane disposed within, on, or behind the seat of a vehicle. During a collision, the crush structure is configured to plastically deform to absorb energy of the impact and reduce the forces applied to the passenger's body during the rapid deceleration or ramp down. In some examples, one or more of the crush structures, or one or more individual crushable elements thereof, may have a surface area, height, thickness, and depth configured to cause the crush structure or crushable element (s) to plastically deform in an axial direction substantially parallel to a longitudinal axis of the vehicle and to limit deflection in lateral and vertical directions of the vehicle. The longitudinal axis of the vehicle is an axis extending through a center of gravity of the vehicle along a length of the vehicle, such that the longitudinal axis is generally aligned with a direction of travel of the vehicle when the vehicle is traveling in a straight line.

In some examples, the techniques described herein may be implemented in a vehicle having a body, which may include a passenger compartment. The passenger compartment may include at least one seat configured to receive an occupant. In some examples, the seat may include a seatback having a first side to receive an occupant and a second side opposite the first side. In some examples, the seatback may include an energy absorber disposed between the first side of the seatback and the second side of the seatback. The energy absorber, in some examples, may provide protection to an occupant in the event of a collision or impact. For instance, in some examples, the energy absorber may include a backplane and/or a crush structure. In some examples, the backplane may be a generally rectangular sheet of material, however, other configurations may be used. The crush structure may include one or more crushable elements protruding from all or part of the backplane. The crush structure may be configured to minimize the force applied to an occupant in the event of an impact or collision. For instance, the crush structure or individual crushable element (s) thereof may be configured to deform along a deformation axis under a compressive force. In some examples, the deformation axis may be substantially parallel to a direction in which the crushable element(s) protrude from the backplane and/or may be aligned with the longitudinal axis of the vehicle. The crush structure may be designed (e.g., shaped and sized) to limit or prevent deflection of the crushable element(s) in a vertical or lateral direction. By designing the crush structure to deform along the deformation axis and not to deflect vertically or laterally, the crush structure may provide a substantially uniform reaction force over an entire ramp down distance, thereby maximizing an amount of energy that the energy absorber is able to absorb during the collision and minimizing forces applied to the passenger.

Some examples described herein include a crush structure comprising multiple chevron-shaped crushable elements. However, in other examples, any number of one or more crushable elements may be used and the crushable element (s) may be a variety of shapes, designs, and/or sizes. Alternate shapes may include, but are not limited to elongated ribs (vertical, horizontal, or at oblique angles), cross shapes, x-shapes, t-shapes, corrugated structures, solid sheets or blocks of material with or without open space (e.g., holes, slots, troughs, voids, etc.) and with or without varying areas of thickness or depth, honeycomb structures, combinations of these, or the like. Several other specific examples are described throughout this application.

In some examples, the energy absorber may include a pelvic support structure. The pelvic support structure may, in some examples, be disposed below the backplane and/or the crushable element(s). In some examples, the pelvic support structure may be itself a crushable and be comprised of the same material(s) as the backplane and/or the crushable element(s). In other examples, the pelvic support structure may include one or more different materials than the backplane and/or the crushable element(s).

In some examples, the energy absorber may be designed to plastically deform under a predetermined compressive load. The predetermined compressive load may be determined based on size and weight of anticipated passengers of the vehicle and anticipated collision speeds. The size, shape, and materials of the backplane, crush structure, and/or pelvic support structure may be chosen so that the energy absorber begins to deform when the predetermined compressive load is reached.

In some examples, the backplane, the crush structure, and/or the pelvic support structure may be formed from a plastically deformable material having a compression strength between about 200 kilopascals and about 600 kilopascals at normal operating temperatures of between −15 degrees Celsius and 60 degrees Celsius. In some examples, the material from which the backplane, the crush structure, and/or the pelvic support structure are made may have a density of at most about 100 grams per liter, at most about 75 grams per liter, or at most about 40 grams per liter. By way of example and not limitation, the crush structure and/or the pelvic support structure may be made of a polymeric foam (e.g., Impaxx 300, expanded polypropylene (EPP) foam density 30 grams per liter or 45 grams per liter, urethane foam, polystyrene foam, etc.), plastic, aluminum, cellulose based material, or a combination of these and/or other materials, for example. In one specific example, the backplane, the crush structure, and/or the pelvic support structure may be formed of a closed cell, thermoplastic foam having a density of at most 40 grams per liter, and a compression strength of at least about 300 kilopascals at 60 degrees Celsius and at most about 500 kilopascals at −15 degrees Celsius.

Depending on the materials from which the energy absorbers are made, the backplane, the crush structure, and/or the pelvic support structure may be formed by extrusion, molding (e.g. injection molding), casting, machining (e.g., by removing select portions of material from one or more blocks of material to form the crushable element(s)), or by other suitable manufacturing techniques. The backplane, the crush structure, and/or the pelvic support structure may be formed separately and attached to one another by, for example, fasteners, adhesive, thermal or sonic welding, interlocking shapes, or other attachment means. In other examples, the backplane, the crush structure, and/or the pelvic support structure may be constructed integrally from a same material. In still other examples, some components or elements of the energy absorber may be formed integrally of a same material and other components or elements of the energy absorber may be formed separately and/or of a different material. By way of example and not limitation, the backplane and crush structure may be formed integrally of a first material and the pelvic support structure may be formed of a separate material and then attached to the backplane.

While examples are provided in which the vehicle is a bidirectional vehicle having carriage seating, with a first set facing in a first direction and a second seat facing in an opposite direction, the techniques described herein are not limited to bidirectional vehicles or to vehicles having carriage seating. For example, the techniques may be applied to traditional, unidirectional vehicles (e.g., cars, trucks, busses, trains, etc.) with front facing occupants and would provide protection for occupants in the case of the vehicle being rear ended, for example.

Example Energy Absorbers

FIG. 1 illustrates a schematic view of an example vehicle 100 having a passenger compartment with a first seat 102A and a second seat 102B arranged facing one another, in accordance with embodiments of this disclosure. Example energy absorbers are located within the seats to absorb energy during a collision. While FIG. 1 illustrates two seats facing one another, any number of one or more seats may be disposed in a vehicle at locations and/or orientations other than what is indicated in FIG. 1. For example, although illustrated as a single seat which can accommodate a single passenger herein, in some examples, multiple individual and/or bench style seats which can accommodate multiple passengers may be disposed in rows facing a same or different direction, or a single seat may be disposed within the vehicle. In the illustrated example, the first seat 102A is disposed proximate a first end of the vehicle and the second seat 102B is disposed proximate a second end of the vehicle. An occupant 104A in the first seat 102A may be positioned by the first seat to face an occupant 104B in the second seat 102B, and these occupants may share a common floor area 106.

In some examples, the vehicle 100 may be an autonomous vehicle configured to operate according to a Level 5 classification issues in 2016 by the U.S. National Highway Traffic Safety Administration, for example, which describes a vehicle capable of performing all safety-critical functions for an entire trip, with the driver (or occupant) not being expected to control the vehicle at any time. In that case, since the vehicle may be configured to control all functions from start to stop, it may be unoccupied. However, this is merely an example, and the systems and methods described herein may be incorporated into any ground-borne vehicle, including those that are manually driven by a human and those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

Vehicle 100 is depicted as having four wheels/tires 108. However, other types and configurations of vehicles are contemplated, such as, for example, vans, sport utility vehicles, crossover vehicles, trucks, busses, agriculture vehicles construction vehicles, and/or trains. Vehicle 100 may be powered by one or more internal combustion engines, electric motors powered by one or more power supplies (e.g. batteries, hydrogen fuel cells, etc.), or any combination thereof. In addition, although vehicle 100 is illustrated to have four wheels/tires 108, the invention described herein may be incorporated into vehicles having fewer or greater number of wheels, tires, and/or tracks. Vehicle 100 has four-wheel steering and may operate generally with equal performance characteristics in all directions, for example, such that the first end 110 of the vehicle 100 is the leading or front end of the vehicle 100 when traveling in a first direction (indicated by the arrow to the left of the vehicle in FIG. 1), and such that the first end 110 becomes the trailing or rear of the vehicle 100 when traveling in the opposite, second direction (indicated by the arrow to the right of the vehicle in FIG. 1). Similarly, a second end 112 of the vehicle 100 is the leading or front end of the vehicle 100 when traveling in the second direction, and the second end 112 becomes the trailing or rear end of the vehicle 100 when traveling in the opposite, first direction, These example characteristics may facilitate greater maneuverability, for example, in small spaces or crowded environments, such as parking lots and urban areas.

In some examples, because of the bi-directionality of the vehicle 100, each of the first seat 102A and the second seat 102B may, at different times, be the leading or trailing seat, as determined by the direction of travel of the vehicle 100. Additionally, or alternatively, each of the first seat 102A and second seat 102B may, at different times, be a forward-facing seat or a rear-facing seat, as determined by the direction of travel of the vehicle 100. For example, while the first end 110 of the vehicle 100 is the leading or front end of the vehicle 100 (e.g., when traveling in the first direction as indicated by the arrow in FIG. 1), the occupant 104A in the first seat 102A is facing backward (e.g., away from the direction of travel) and the occupant 104B in the second seat 102B is facing forward (e.g., toward the direction of travel). In such a case, a collision against the first end 110 of the vehicle 100 by an object may impart a rear-end type collision on the occupant 104A in the first seat 102A while imparting a front-end type collision on the occupant 104B in the second seat 102B. In such event, there is only a small distance between the occupant 104A and the body of the vehicle 100 over which to absorb energy of an impact. In high-impact events, traditional seats constructed of a rigid frame with elastomeric padding may not provide adequate energy absorption to dissipate the forces of the impact, leaving the occupant 104A in danger of serious injury. This application describes examples in which the seats 102A and 102B include energy absorbers to absorb some of these impact forces, thereby reducing the forces imparted to the rear-facing occupants 104A.

FIG. 1 illustrates an enlarged depiction of seat 102A disposed within the body of the vehicle 100. While only details of seat 102A are depicted, seat 102B may include some or all of the components of seat 102A. In some examples, seat 102A may have a seat bottom 114 and/or a seatback 116. The seat bottom 114 may be configured to receive the seat of the occupant 104A. The seat bottom 114 may be disposed at an angle (α) relative to the floor area 106. In some examples, the angle α may be substantially zero (meaning that the seat bottom 114 is substantially parallel to the floor area 106) while in other examples the angle α may be at inclined relative to the floor area 106 (e.g., the angle α may be between 1 degree and 30 degrees). In some examples, the angle α of the seat bottom 114 relative to the floor area 106 may be adjustable. Additionally, or alternatively, the seat 102A may have a seatback 116 which may be disposed at an angle (θ) relative to the seat bottom 114. In some examples, the seatback 116 may be disposed substantially perpendicular to the seat bottom 114 and the angle θ may be about 90 degrees, while in other examples the seatback 116 may be disposed at an oblique angle (e.g., θ may be an angle between 91 degrees 120 degrees). In some examples, the angle θ between the seatback 116 and/or seat bottom 114 may be adjustable.

The seatback 116, in some examples, may have a first side 118 and a second side 120. In some examples, the first side 118 of the seatback 116 may be opposite the second side 120 of the seatback 116. The first side 118 of the seatback 116 may be configured to receive and support a back of the occupant 104A. The second side 120 of the seatback 116 may be adjacent to and/or may abut a portion of the body 122 of the vehicle 100. In some examples, the first side 118 of the seatback 116 may be comprised of materials such as leather and/or fabric, for example. One or more layers of padding 124, such as elastomeric foam, may be disposed beneath the leather or fabric cover for passenger comfort. In some examples, the first side 118 of the seatback 116 may include multiple layers of the same or different materials. In some examples, an energy absorber 126 may be disposed within seat 102A between the first side 118 of the seatback 116 and the second side 120 of the seatback 116. During a collision, the energy absorber 126 may compress (in plastic deformation) between the back of the occupant 104A and the body 122 of the vehicle to decelerate the occupant 104A.

The energy absorber 126 in this example includes a backplane 128, a crush structure 130, and a pelvic support structure 132. The backplane 128 may extend from a first location at or above the seat bottom 114 to a second location at or below a top of the seatback 116. The crush structure 130 in this example protrudes from the backplane 128 toward the second side 120 of the seatback 116. In this example, the crush structure 130 protrudes from only a portion of the backplane 128. That is, in this example, the crush structure 130 includes multiple crushable elements that protrude from multiple different portions of the backplane 128, while other portions of the backplane 128 do not have crushable elements protruding therefrom.

The pelvic support structure 132 may be disposed below the backplane 128 and/or the crush structure 130 in a region proximate a pelvis of the occupant 104A. The pelvic support structure 132 may have a same or different depth than the crush structure 130 and may be made of a same or different material than the backplane 128 and/or crush structure 130. By way of example and not limitation, the pelvic support structure 132 may have a greater depth than the backplane 128 and/or crush structure 130 and may be made of a material having a compression strength higher than that of the backplane 128 and/or crush structure 130. In some examples, as described above, the vehicle 100, may travel in a first direction. During a collision while traveling in the first direction, the backplane 128, the crush structure 130, and/or the pelvic support structure 132 may be configured to plastically deform to absorb the energy of the impact and reduce the forces applied to the passenger's body during rapid deceleration or ramp down. The energy absorber 126 is described in greater detail below.

Figure 2:
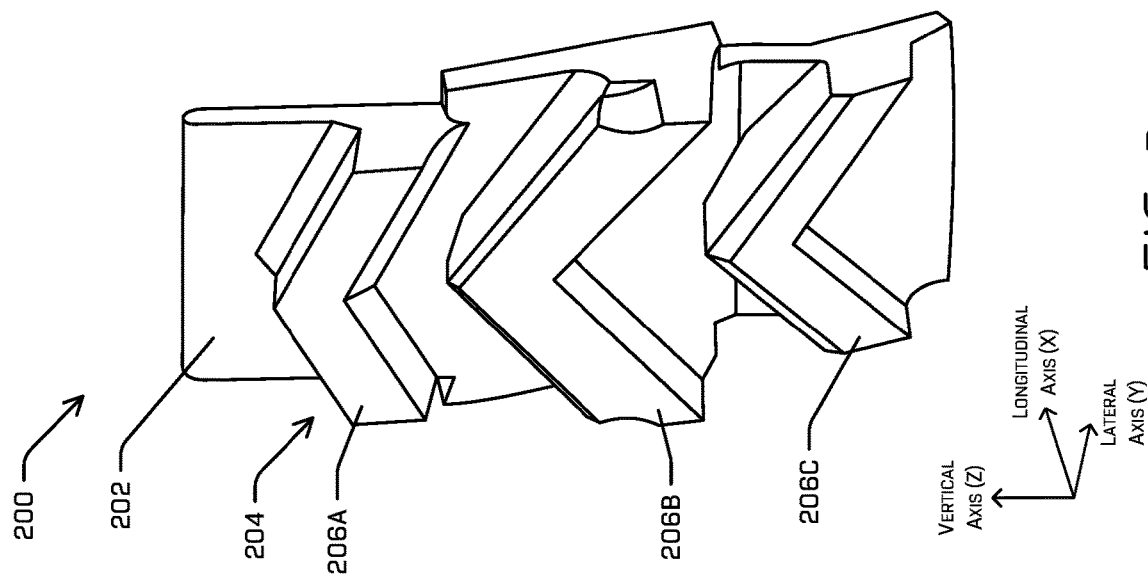
FIG. 2 illustrates a perspective view of an example energy absorber including a backplane and three chevron-shaped crushable elements, in accordance with embodiments of this disclosure.

FIG. 2 illustrates a perspective view of another example energy absorber 200 that can be used with a vehicle such as vehicle 100. For ease of explanation, a coordinate system is provided which shows the longitudinal axis (X), the lateral axis (Y), and the vertical axis (Z). Reference is made to these axes throughout the description in relation to the vehicle 100 and the energy absorbers 200. The energy absorber 200 of this example includes a backplane 202 and a crush structure 204 having multiple chevron-shaped crushable elements 206, including a first crushable element 206A, a second crushable element 206B, and a third crushable element 206C (collectively "crushable elements 206"). Although this example depicts three crushable elements 206, any number of one or more crushable elements may be used in other examples. Also, in this example, all three of the crushable elements 206 are depicted as being chevron-shaped and being positioned substantially equidistantly along a height of the energy absorber 200. However, as discussed above, in other examples, any one or more of the crushable elements 206 may comprise various different shapes, sizes, positions, orientations, and/or configurations, including but not limited to any of those described throughout this application.

The backplane 202 and/or crushable element 206 may comprise any of the energy absorbing materials described throughout the application and may be formed using any of the manufacturing techniques described throughout the application. In some examples, the backplane 202 may comprise energy absorbing material(s) that are different from the energy absorbing material(s) of the crush structure 204 and/or any one or more of the crushable elements 206 thereof. For example, an energy absorbing material of the first crushable element 206A, the second crushable element 206B, and/or third crushable element 206C may be more ductile and/or have a lower compression strength than the energy absorbing material in the backplane 202. That is, the backplane 202 may, in some examples, be more rigid and/or have higher compression strength than the crushable element 206 in order to distribute loads from the individual crushable element 206 and provide a uniform reaction force. In other examples, the backplane may comprise a non-energy absorbing and/or non-crushable material, such as, for example, plastic (e.g., polypropylene, nylon, etc.). Alternatively, backplane 202, first crushable element 206A, second crushable element 206B, and/or third crushable element 206C may include the same or similar energy absorbing materials, as discussed above.

The energy absorber 200 can be made using any of the manufacturing techniques described throughout the application. In one example, the energy absorber 200 may be formed by injection molding the backplane 202 and the crush structure 204 (including the first crushable element 206A, the second crushable element 206B, and/or the third crushable element 206C) as an integral unit of a same material (e.g., a thermoplastic foam, such as Impaxx 300). In other examples, the backplane 202 and crushable elements can be molded as separate components. In other examples, the energy absorber 200 may be formed by machining the shape from one or more blocks of material. When formed separately, the crushable elements 206 may be to the backplane 202 by any of the attachment means described herein.

Figure 3:
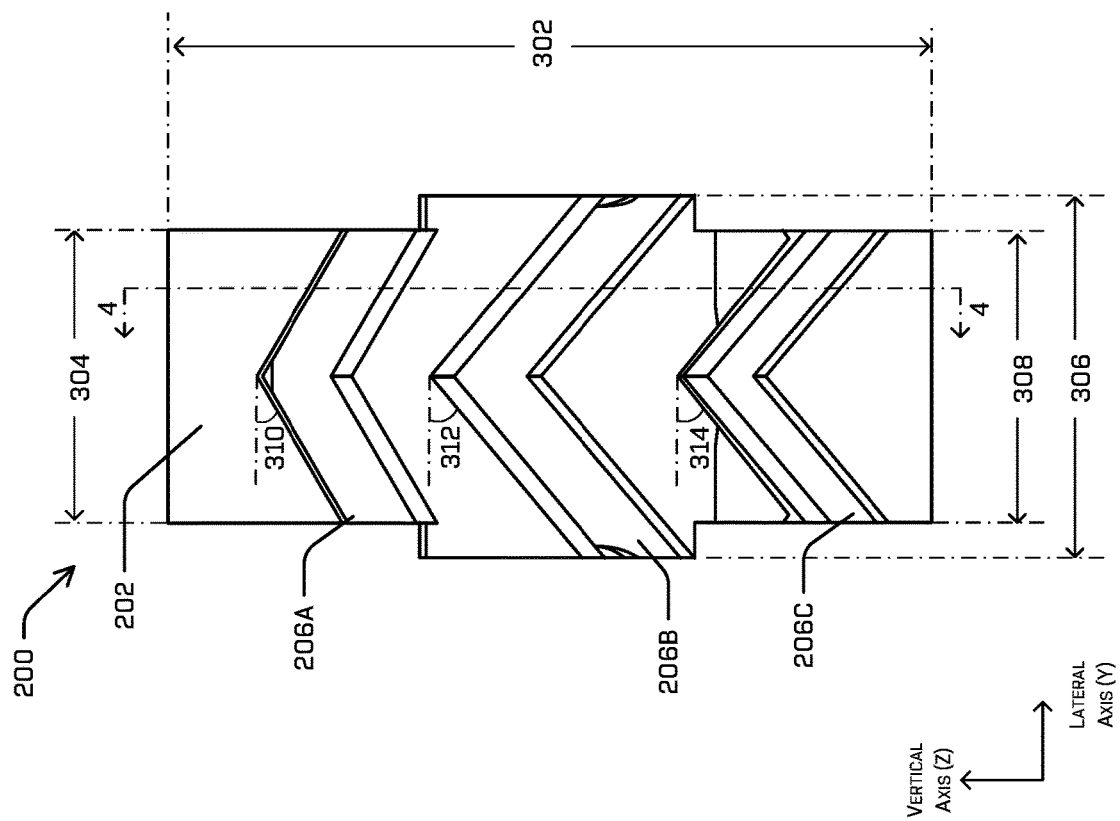
FIG. 3 illustrates a back view of the energy absorber of FIG. 2.

FIG. 3 illustrates a back view of the energy absorber of FIG. 2 (e.g., viewed from the second/back side of the seatback). As shown in this example, the backplane 202 is a contoured sheet of material having a height 302, a first width 304 over a top portion, a second width 306 over a middle portion, and a third width 308 over a lower portion. In some examples, each of the top portion, the middle portion, and the lower portion may be approximately ⅓ of the overall height 302 of the backplane, while in other examples, the relative heights of the top portion, the middle portion, and the lower portion may vary (e.g., the proportions of the top/middle/lower portions may be 25/50/25, 20/40/40, 20/50/30, 30/40/30, etc.). In the illustrated example, the second width 306 is greater than the first width 304 and the third width 308, and the first width 304 is substantially the same as the third width 308. However, in other examples, the first width 304, the second width 306, and/or the third width 308 may be wider or narrower than the example shown. For instance, in other examples, the backplane 202 may have a constant width (i.e., the first width 304, the second width 306, and the third width 308 may be substantially the same), the first width 304 and the third width 308 may be different than each other (e.g., the first width 304 may be narrower than the third width 308), etc. By way of example and not limitation, the height 302 may be between about 250 mm and about 750 mm, and in some examples may be between about 350 mm and about 550 mm. Also by way of example and not limitation, each of the first width 304, the second width 306, and/or the third width 308 may be between about 75 mm and about 600 mm, between about 100 mm and about 400 mm, or between about 120 mm and about 210 mm. In some examples, the first width 304 and the third width 308 may be between about 100 mm and about 170 mm, while the second width 306 may be between about 100 and about 210 mm. However, in other examples, the height 302, the first width 304, the second width 306, and/or the third width 308 may be greater or less than the example ranges given depending on the configuration of the vehicle, the seat, and the passengers with which the energy absorber is designed to be used.

As discussed above, the crushable elements 206 in this example are chevron-shaped. The crushable elements 206 are illustrated as extending substantially the width of the portion of the backplane from which they protrude. That is, the first crushable element 206A has an overall width substantially equal to that of the first width 304 of the top portion of the backplane, the second crushable element 206B has an overall width substantially equal to that of the second width 306 of the middle portion of the backplane, and the third crushable element 206C has a width that is substantially equal to that of the third width 308 of the lower portion of the backplane. However, in other examples the crushable elements 206 may have overall widths that are greater than or less than the respective portions of the backplane from which they protrude.

Additionally, each of the chevron-shaped crushable elements 206 comprises a pair of arms that meets at a point. In the illustrated example, the chevrons are oriented with the point facing upward, however in other examples the chevrons could be inverted with the points facing downward. In the illustrated example, the arms of the first crushable element 206A form a first angle 310 relative to the lateral axis (Y), the arms of the second crushable element 206B form a second angle 312 relative to the lateral axis (Y), and the arms of the third crushable element 206C form a third angle 314 relative to the lateral axis (Y). The angles at which the arms of the respective chevron-shaped crushable elements 206 meet may be the same or different for each crushable element. In the illustrated example, the first angle 310 may be less than the second angle 312 and the third angle 314. In other examples, first angle 310 may be the same as the second angle 312 and/or the third angle 314. The angles at which the arms of the crushable elements 206 meet provide vertical and lateral stability for crushable elements 206, thereby limiting their tendency to deform laterally or vertically during a collision. For example, in the event of a collision, the crushable elements 206 may deform axially along the longitudinal axis (X) (into the page in FIG. 3) and may to limit or resist deflection of the crushable elements in the vertical and/or lateral directions. In general, the smaller the angle the better the resistance to lateral deflection, and the larger the angle the better the resistance to vertical deflection. In some examples, in order provide resistance to deflection in both the lateral and vertical directions, the first angle 310, the second angle 312, and/or the third angle 314 may each be between about 0 degrees and about 50 degrees relative to the lateral axis (Y), and in some examples between about 15 degrees and about 40 degrees relative to the lateral axis (Y). However, other angles greater than or less than the example ranges given may be used depending on the configuration of the vehicle, the seat, and the passengers with which the energy absorber is designed to be used.

FIGS. 4A and 4B illustrate cross-sectional views of the energy absorber 200 of FIG. 2 taken along line 4-4 in FIG. 3. FIG. 4A illustrates a cross sectional view of the energy absorber 200 prior to deformation, and FIG. 4B shows the energy absorber 200 in a deformed state (e.g., during or after a collision). The energy absorber 200 may have a depth sufficient to allow the energy absorber to plastically deform to absorb energy of the occupant imparted to the seat back during a collision. By way of example and not limitation, the energy absorber 200 may have a total depth 400 of at least about 40 mm, between about 50 mm and about 300 mm, between about 75 mm and about 200 mm, or between about 100 mm and about 150 mm. In some examples, the backplane 202 of the energy absorber 200 may have a backplane depth 402 of between about 0 mm and about 75 mm, between about 10 mm and about 60 mm, or between about 25 mm and about 50 mm. The backplane depth 402 is shown as being substantially uniform over the height 302 of the backplane 202 in this example, but in other examples the backplane depth 402 may vary over the height 302. In the illustrated example, the first crushable element 206A has a first crushable element depth 404, the second crushable element 206B has a second crushable element depth 406, and the third crushable element 206C has a third crushable element depth 408. The first crushable element depth 404, the second crushable element depth 406, and the third crushable element depth 408 may be the same or different from one another. By way of example and not limitation, the depth of each of the crushable elements 206 may be between about 25 mm and about 290 mm, between about 35 mm and about 200 mm, or between about 40 mm and about 100 mm. However, the total depth 400, the backplane depth 402, the first crushable element depth 404, the second crushable element depth 406, and/or the third crushable element depth 408 may be greater than or less than the example ranges given depending on the configuration of the vehicle, the seat, the forces of collision to be mitigated, an available space in the seatback, and/or the passengers with which the energy absorber is designed to be used.

FIG. 4B illustrates a cross sectional view of the energy absorber 200 in a deformed state after a compression force has been applied and the energy absorber 200 during a collision. As shown, when sufficient forces are applied, the backplane 202, the first crushable element 206A, the second crushable element 206B, and the third crushable element 206C are plastically deformed along the longitudinal axis (X) of the vehicle. As discussed above, the shape, size, and configuration of the crushable elements 206 can be chosen to limit or prevent deflection of the crushable elements 206 in the lateral direction (into/out of the page in FIGS. 4A and 4B) and/or the vertical direction (Z).

As discussed above, in the event of a collision, a rearward-facing occupant may be thrown against the seatback of the vehicle. The force from the occupants back may be transferred to the backplane 202 of the energy absorber 200, pressing the energy absorber 200 against a portion of a body of the vehicle (e.g., the body 122 shown in FIG. 1). Thus, the body of the vehicle produces a reaction force substantially opposite the direction of the force applied by the occupant's back. The force of the occupant's back and the reaction force are shown as opposing arrows in FIGS. 4A and 4B. If the opposing forces exceed a threshold force, the energy absorber 200 will begin to plastically deform in a direction substantially aligned with the longitudinal axis (X) of the vehicle. An amount of energy that the energy absorber 200 can absorb depends on the force required to plastically deform the energy absorber and the distance (D) over which the energy absorber 200 can be deformed during the collision, which is based at least in part on the depth 400 of the energy absorber 200. In the illustrated example, the distance (D) over which the energy absorber 200 can be deformed is shown as the difference between the pre-deformation shape (shown in FIG. 4A and shown in broken lines in FIG. 4B) and the shape of the energy absorber 200 after being deformed (shown in FIG. 4B).

Because the energy absorber 200 dissipates energy by plastically deforming during the collision, the energy absorber maintains the occupant's back coupled to the seatback during the collision. In contrast, conventional seatbacks comprised of elastomeric materials tend to store energy like a spring which can rebound causing separation between an occupant's back and the seatback. The threshold force required to begin deforming the energy absorber is a function of the material or materials from which the energy absorber 200 is made and a cross-sectional area of the energy absorber 200 over the depth of the energy absorber 200. Example materials from which the energy absorber can be constructed are described throughout this application. The cross-sectional area may be uniform over the depth, or may vary over the depth, such as in the case of example energy absorber 200. The cross-sectional area of the energy absorber 200 varies over the depth of the energy absorber 200, having a first cross-sectional area over a first portion of the total depth 400 (e.g., the backplane portion, which in this example is a solid backplane 202) and a second cross sectional area over a second portion of the total depth 400 (e.g., the crush structure portion of the depth, which in this example comprises the three chevron-shaped crush structures 206). In some examples, a combined cross-sectional area of the crushable elements 206 and the material(s) of the energy absorber may be chosen such that the crushable elements are configured to plastically deform in response to a predetermined force threshold, such as an expected force resulting from a collision with an object at or above a predetermined speed (e.g., at or above 25 kilometers per hour, 35 kilometers per hour, 50 kilometers per hour, etc.). By way of example and not limitation, a combined cross-sectional area of the crushable elements 206 may be at least about 45 cm$^2$, between about 45 cm$^2$ and about 800 cm$^2$, or between about 100 cm$^2$ and about 500 cm$^2$. Additionally, in some examples certain minimum dimensions may help to ensure that the crushable elements crushable elements deform substantially axially and resist deflection in the vertical and/or lateral direction. By way of example and not limitation, one or more of the crushable elements may have a cross-section having a height of at least about 15 mm and/or a width of at least about 40 mm.

FIGS. 5A-5D illustrate cross-sectional views of example chevron-shaped crushable elements that are usable with an energy absorber such as energy absorber 126 of FIG. 1 and/or energy absorber 200 of FIG. 2. FIGS. 5A-5D illustrate several characteristics of crushable elements that can be used to tune performance of the energy absorber during a collision. Any of the characteristics (e.g., size, shape, dimensions, etc.) may be applied to any one or more of the crush structure 130 and/or crushable elements 206 of the examples of FIG. 1 or 2. Also, while these characteristics are described and illustrated in the context of chevron-shaped crushable elements, the characteristics may be applied to other shapes, sizes, and configurations of crush structures to achieve the same or similar changes in performance.

FIG. 5A illustrates a cross-sectional view of a first crushable element 500A protruding from a backplane 501. The first crushable element 500A has a depth 502. The depth 502 of the first crushable element 500A may be in the range of any of the example depths given for crushable elements throughout this disclosure (e.g., between about 25 mm and about 290 mm, between about 35 mm and about 200 mm, between about 40 mm and about 100 mm, etc.). In general, the depth 502 dictates a distance over which the first crushable element can deform during a collision and therefore an amount of energy that can be absorbed by the first crushable element 500A upon impact. For example, a larger depth may allow a greater amount of energy to be absorbed over the course of the collision. The thickness 504 of the may be substantially uniform over the width of the first crushable element 500A (the width being measured along the lateral axis, which is into the page in this figure) or may vary over the width (e.g., may have a different thickness at different positions along the lateral axis). In general, the thickness 504 (in combination with the width and the material) dictates a load that the crushable element may resist upon impact or collision. Thus, for a given material and width, the crushable element or section thereof having the smallest thickness will be the weakest and will begin plastically deforming first. Accordingly, in some examples, the crushable element or portion thereof having the smallest thickness may dictate failure load of the energy absorber of which the crushable element is a part. By way of example and not limitation, the first crushable element 500A may have a thickness 504 of between about 10 mm and about 200 mm, between about 15 mm and about 150 mm, between about 20 mm and about 60 mm, etc. However, in other examples, the first crushable element 500A may have a thickness greater than or smaller than the examples given.

FIG. 5A illustrates an example in which the first crushable element 500A protrudes from the backplane 501 such that a radius of curvature 506 is formed between the backplane 501 and the first crushable element 500A. In some examples, the radius of curvature 506 may be between about 1 mm and about 50 mm, between about 2 mm and about 35 mm, or between about 5 mm and about 25 mm. However, in other examples, crushable elements according to this disclosure may have radii of curvature that are greater than or less than the examples given (including zero radius of curvature in some examples). In some examples, a large radius may improve off-axis failure performance. That is, a larger radius of curvature may configure the crushable element to resist or limit deflection in the lateral or vertical directions. Additionally, increasing the radius of curvature 506 may increase the effective average thickness of the first crushable element 500A.

In some examples, the thickness of crushable element(s) of an energy absorber may vary over their depth (e.g., the thickness of a crushable element may change along the depth/longitudinal direction). This change in thickness may occur in steps and/or may occur gradually over a sloped or tapered region. FIG. 5B illustrates a cross-sectional view of a second crushable element 500B having a stepped profile and FIG. 5C illustrates a third crushable element 500C that includes both stepped and tapered portions. In general, stepped portions allow for stepwise increases in crush resistance during ride down, and sloped or tapered portions allow for gradually (e.g., linearly or exponentially) increasing crush resistance during ride down, while substantially uniform thickness provides for a substantially flat load curve that only ramps at the end of the ride down. Stepped and/or tapered crushable elements may be used to tune energy absorbers for different masses of occupants (e.g. 5th vs 50th percentile occupants) and/or different collision conditions (e.g., speeds, directions, etc.).

FIG. 5B shows the second crushable element 500B having a first thickness 508 at a first end proximal the backplane 501 and a second thickness 510 proximal a second end distal from the backplane 501. In this example, the second thickness 510 is shown as being thinner than the first thickness 508. In some examples, the second thickness 510 may be about 10% thinner, about 25% thinner, about 50% thinner, or any other amount thinner than the first thickness 508. Moving in the longitudinal direction away from the backplane 501 (from right to left in FIG. 5B), the second crushable element 500B transitions from the first thickness 508 to the second thickness at a step 512. The step 512 is not is not an immediate/discrete step, but rather occurs over a short distance along the depth of the second crushable element 500B (e.g., 10-25% of the overall depth in this example). In other examples, steps may be more or less gradual than the example shown (e.g., may occur over longer or shorter portions of the overall depth of the crushable element). While only one step is shown in this example, in other examples, crushable element(s) may have any number of steps. For example, the crushable element(s) may have one step, two steps, three steps, four steps, etc. Additionally, while in the example of FIG. 5B, only one side of the thickness is stepped (the bottom side in this example), in other examples the top and/or bottom of the crushable element may be stepped. When present, the number, location, and thickness of the step(s) (i.e., the difference between the first thickness 508 and the second thickness 510 in the example shown) may be chosen to achieve desired change(s) in crush resistance during ride down.

FIG. 5C illustrates a cross-sectional view of the third crushable element 500C with a profile having stepped upper and lower portions as well as a sloped or tapered upper and lower portions. The stepped and tapered profile of the third crushable element 500C is an example of a crushable element that has been tuned to provide variably and progressively increasing crush resistance during ramp down. In this example, the third crushable element 500C has a first thickness 514 at an end proximal to the backplane 501, a second thickness 516 at an end distal from the backplane 501, and a third thickness 518 between the proximal end and the distal end. Moving away from the backplane in the longitudinal direction (from right to left in FIG. 5C), the third crushable element 500C has the first thickness 514 at the end proximal to the backplane 501, a first transition zone 520 over which the thickness transitions in a stepwise fashion over a relatively short span of depth (less than 20% of the overall depth) to the second thickness 516, a second transition zone 522 over which the thickness transitions more gradually in both steps and tapered portions over a larger span of depth (e.g., 60-80% of the overall depth), culminating in the second thickness 516 at the distal end of the third crushable element 500C. However, in other examples, the number, location, and thickness of the step(s) and/or tapered portions may be chosen to achieve desired change(s) in crush resistance during ride down.

FIG. 5D illustrates a cross-sectional view of a fourth crushable element 500D. In some examples, crushable element(s) according to this disclosure may have one or more notches, channels, or other voids. When present, the voids may be disposed in the backplane, as in the example of FIG. 5D, or they may be interposed between the backplane and the crushable element. In the illustrated example, a notch 524 is disposed in the backplane 501 adjacent to the fourth crushable element 500D. The notch 524 may, in some examples, minimize the thickness of the crushable element (s) (thereby minimizing the crush resistance of the crushable element), while maintaining resistance to off-axis loading (e.g., resistance to deflection in the lateral and/or vertical directions during collision). In some examples, multiple notches may be used. Also, the size, shape, and position of the notch may be chosen to achieve the desired crush resistance and resistance to deflection in the vertical and lateral directions. In the illustrated example, the notch 524 is a triangular notch having a height 526 and a peak angle 528. By way of example and not limitation, the height 526 may be between about 1 mm and about 100 mm, between about 5 mm and about 50 mm, or between about 10 mm and about 25 mm, and the peak angle 528 may be between about 10 degrees and about 130 degrees, between about 20 degrees and about 90 degrees or between about 30 degrees and about 60 degrees. However, in other examples, the size, shape, placement, dimensions, radii of curvature, and other configurations of the void(s) may vary. For instance, in some examples, notches, channels or other voids may have cross sections that are rectangular, semi-cylindrical, ovoid or any other suitable shape. In some examples, notches, channels or other voids having curved cross-sectional shapes or that have rounded corners may help to reduce stress risers and avoid crack propagation in the energy absorber during a collision.

While certain dimensions are given for the first crushable element 500A, the second crushable element 500B, the third crushable element 500C, and the fourth crushable element 500D, these dimensions are just illustrative and any one or more of the first crushable element 500A, second crushable element 500B, third crushable element 500C, and/or fourth crushable element 500D may have other dimensions (e.g., height, width, depth, thickness, cross sectional area, radii of curvature, steps, etc.) including any of the example dimensions given for crushable elements throughout this application.

Figure 6:
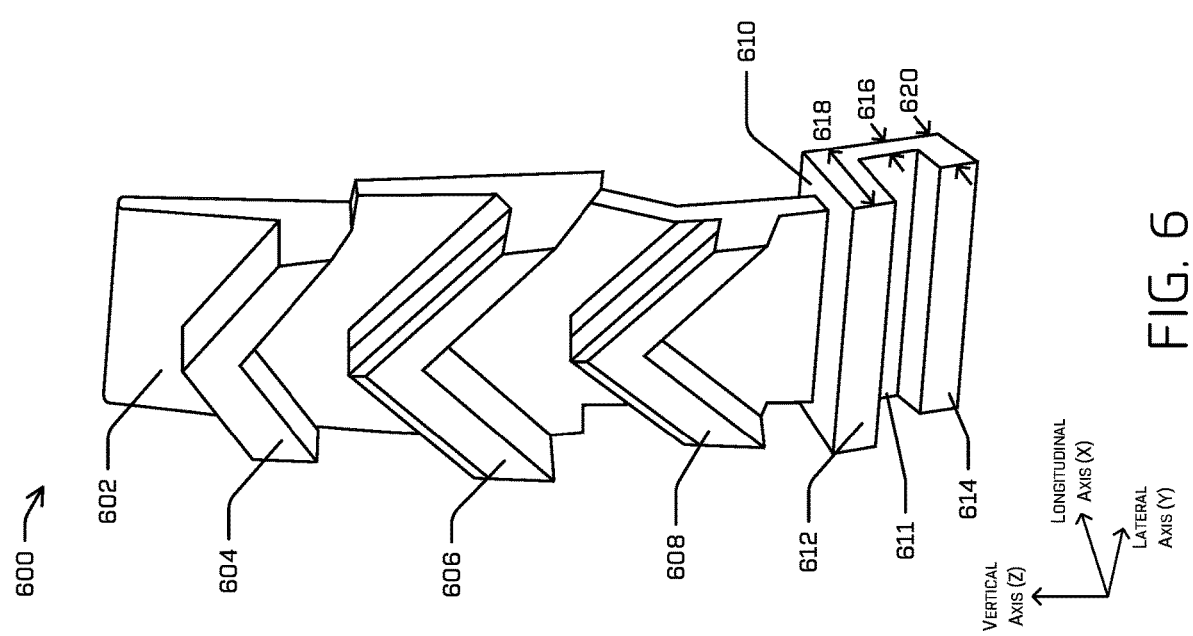
FIG. 6 illustrates a perspective view of an example energy absorber having chevron-shaped crushable elements and a pelvic support structure.

FIG. 6 illustrates a perspective view of an example energy absorber 600 having a backplane 602 and three chevron-shaped crushable element(s), including a first crushable element 604, a second crushable element 606, and a third crushable element 608. The energy absorber 600 of this example also includes a pelvic support structure 610. The energy absorber 600 is similar in many respects to energy absorber 126 and energy absorber 200 and may include details and variations described above with reference to those examples. For instance, although FIG. 6 depicts three crushable elements arranged in a vertical array, any number of crushable elements may be used in any position and orientation relative to one another. As another example, while the crushable elements are depicted as chevron-shaped, the crushable elements may comprise various different shapes, sizes, and configurations including any of those described throughout this application.

In some examples, the energy absorber 600 may include a pelvic support structure 610. The pelvic support structure 610, in some examples, may be disposed within the seat of a vehicle below the backplane 602 and/or the third crushable element 608. In some examples, the pelvic support structure 610 may be formed from a plastically deformable material, as described above.

The pelvic support structure 610 may be made of the same or similar material as the backplane 602, the first crushable element 604, the second crushable element 606, and/or the third crushable element 608. In some examples, the pelvic support structure 610 may include a pelvic backplane 611 and one or more pelvic crushable element(s), similar to the crushable elements protruding from the backplane 602. For example, in the illustrated example, the pelvic support structure 610 includes a first pelvic crushable element 612 and a second pelvic crushable element 614 protruding from the pelvic backplane 611. In some examples, the first pelvic crushable element 612 and the second pelvic crushable element 614 may protrude from the pelvic backplane 611 in substantially a same direction that the first crushable element 604, second crushable element 606, and/or third crushable element 608 protrude from the backplane 602. However, in other examples, the first pelvic crushable element 612 and the second pelvic crushable element 614 may protrude from the pelvic backplane 611 in a direction that is oriented slightly downward relative to the direction in which the first crushable element 604, second crushable element 606, and/or third crushable element 608 protrude from the backplane 602. Also, while two pelvic crushable elements are shown in this example, in other examples the pelvic support structure may include any number (e.g., zero, 1, 2, 3, etc.) of pelvic crushable elements. The pelvic crushable element(s) may in some examples, be rectangular in shape, however, in other examples, the pelvic crushable elements may comprise various shapes, sizes, positions, orientations, and configurations, including any of those described throughout this application with reference to crushable elements, such as, for example, elongated ribs (vertical, horizontal, or at oblique angles), cross shapes, x-shapes, t-shapes, corrugated structures, solid sheets or blocks of material with or without open space (e.g., holes, slots, troughs, voids, etc.) and with or without varying areas of thickness or depth, honeycomb structures, combinations of these, or the like. In this example, the pelvic backplane 611 has a depth 616, the first pelvic crushable element 612 has a depth 618, and the second pelvic crushable element 614 has a depth 620. By way of example and not limitation the depth 616 may be between about 15 mm and about 75 mm, between about 20 mm and about 60 mm, or between about 25 mm and about 50 mm, while the depth 618 and the depth 620 may be the same or different and each may be between about 25 mm and about 250 mm, between about 35 mm and about 150 mm, or between about 40 mm and about 85 mm. The depth 616, the depth 618, and the depth 620 may be greater than or less than the example ranges given depending on the configuration of the vehicle, the seat, the forces of collision to be mitigated, an available space in the seatback, and/or the passengers with which the energy absorber is designed to be used.

Figure 7:
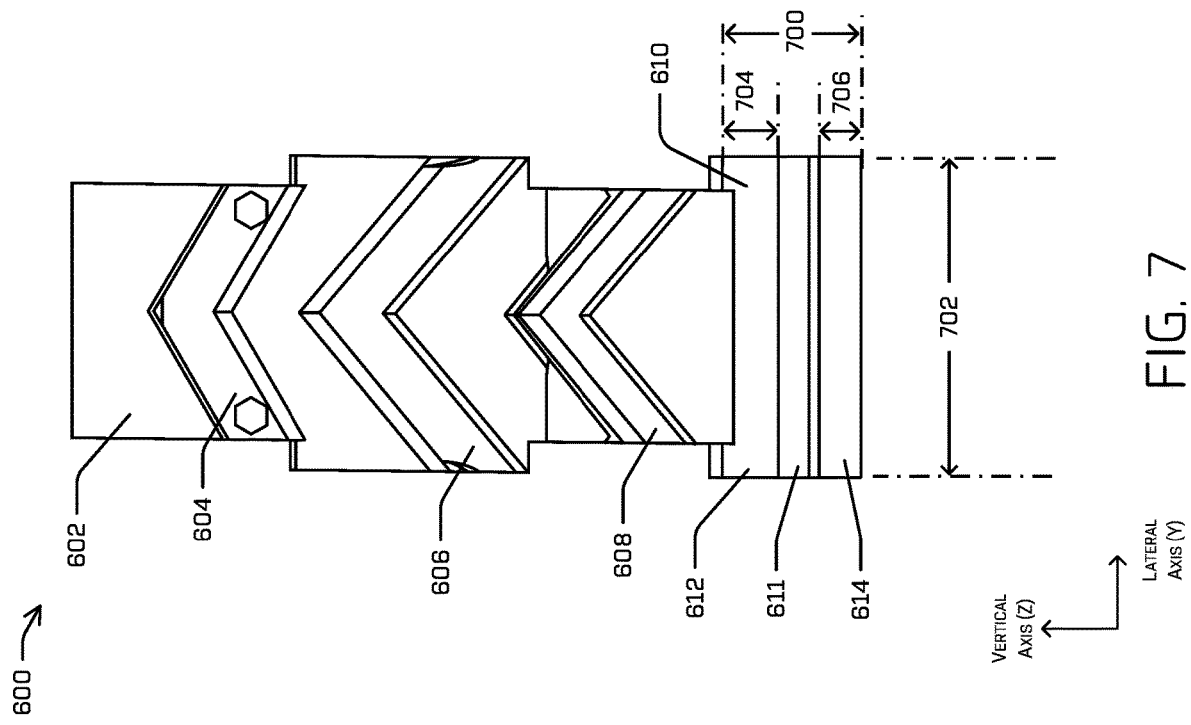
FIG. 7 illustrates a back view of the example energy absorber of FIG. 6.

FIG. 7 illustrates a back view of the example energy absorber 600 of FIG. 6. As shown in FIG. 7, the pelvic support structure 610 has a height 700 and a width 702. By way of example and not limitation, the height 700 of the pelvic support structure 610 may be between about 75 mm to about 300 mm, between about 90 mm and about 250 mm, or between about 100 mm and about 200 mm, and the width 702 may be between about 200 mm and about 600 mm, between about 250 mm and about 500 mm, or between about 300 mm and about 400 mm. However, the height 700 of the pelvic support structure 610 may be greater or less than the example range given, For example, the backplane 602 may extend into the space occupied by the pelvic support structure 610 as depicted in FIG. 6, such that the energy absorber 600 includes four or more crushable elements, for example. Also, the first pelvic crushable element 612 may have a first thickness 704 (measured in the vertical direction) and the second pelvic crushable element 614 may have second thickness 706. The first thickness 704 and the second thickness 706 may be the same or different. By way of example and not limitation, each of the first thickness 704 and the second thickness 706 may be between about 25 mm and about 125 mm, between about 40 mm and about 100 mm, or between about 50 mm and about 75 mm. However, in other examples, the height 700 of the pelvic support structure 610, the width 702 of the pelvic support structure 610, the thickness of the first pelvic crushable element 612, and/or the thickness of the second pelvic crushable element 614 may be greater or less than the example ranges given depending on the configuration of the vehicle, the seat, and the passengers with which the pelvic support structure 610 is designed to be used.

FIGS. 8A-8J illustrate other examples of structures that may be used to form crushable elements in accordance with example energy absorbers used in seats of vehicles. The structures shown in FIGS. 8A-8J may be used in addition to, or instead of, the chevron-shaped crushable elements described in example energy absorber 126, 200, and/or 600. One or more of the crushable elements illustrated in FIGS. 8A-8J may, in some examples, be configured to protrude from or be coupled to a backplane or other structure of an energy absorber, such as backplane 128, 202, and/or 602. The crushable element(s) shown in FIGS. 8A-8J may be made of any plastically deformable material, including any of the materials described throughout the application. The crushable element(s) may be configured to deform axially along an axis substantially aligned with a direction of travel of a vehicle in which the crushable element(s) are installed. While the crushable elements of FIGS. 8A-8J are shown in a particular orientation, the orientation in which they are shown does not indicate an orientation in which they must be incorporated into an energy absorber in a vehicle. Various example loads are illustrated by arrows in FIGS. 8A-8J. For ease of description, a direction of the example load shown in FIGS. 8A-8J is referred to as the depth of the example crushable elements. However, the crushable elements shown in FIGS. 8A-8J may be incorporated into an energy absorber of a vehicle, such as in a seat of a vehicle, at any orientation, angle, and/or position that is suitable to perform the energy absorbing functions described throughout the application. Moreover, the dimensions (e.g., height, width, depth, thickness, cross-sectional area, angles, etc.) of the crushable elements of FIGS. 8A-8J may be chosen to a achieve a desired amount of energy absorption over a specified ramp down distance.

FIGS. 8A-8F illustrate examples of crushable elements that are made from crushable materials, including any of those described above for use with the crush structures or crushable elements. FIGS. 8G-8J illustrate examples of crushable elements that are made of other materials (e.g., steel, iron, aluminum, fiberglass, carbon fiber, ceramic, etc.) which materials may not be thought of as being crushable in a solid block form, but which when formed into the shapes and geometries shown in FIGS. 8G-8J are plastically deformable and provide crush resistance suitable for use with energy absorbers according to the techniques described herein. Each of the crushable elements is described briefly below.

Figure 8A:
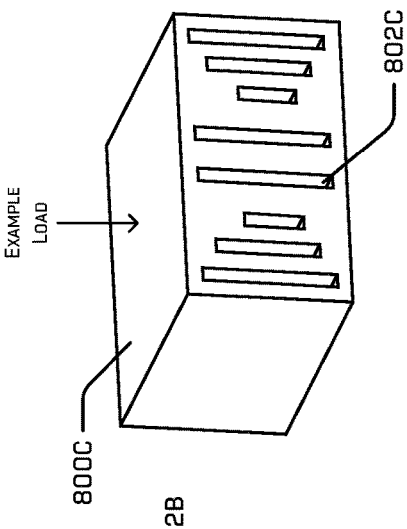
FIGS. 8A-8J illustrate various example configurations of crushable elements in accordance with embodiments of this disclosure.

FIG. 8A illustrates an example crushable element 800A comprising a rectangular prism with two slots 802A extending through an interior thereof, the slots 802A having stepped pyramidal cross-sections. In the illustrated example, the slots 802A provide the crushable element 800A with a cross-sectional area that varies over its depth, thereby configuring the crushable element to provide different crush resistance at different degrees of deformation over a ramp down distance (e.g., increasing crush resistance with increasing loads). Also, because of the stepped shape of the slots 802A, the changes in crush resistance over the ramp down distance may be stepwise changes.

Figure 8B:
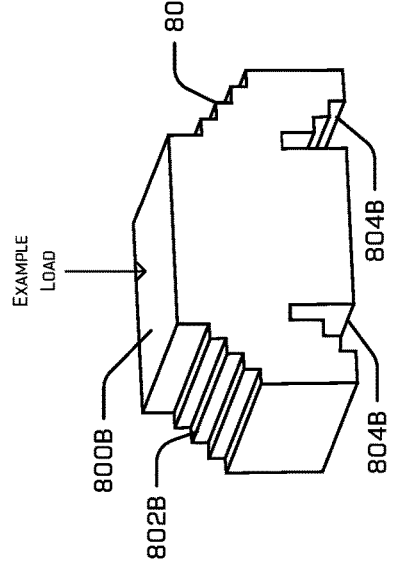

FIG. 8B illustrates an example crushable element 800B comprising a rectangular prism with notches 802B removed from two shoulders thereof, and with two channels 804B formed in an intermediate portion of a side of the prism opposite the two notches 802B. In this example, the notches 802B and the channels 804B are illustrated as having stepped profiles. However, in other examples, the profiles may be tapered, curved, or other shapes depending on the desired crush resistance characteristics. The notches 802B and the channels 804B provide the crushable element 800B with a cross-sectional area that varies over its depth, thereby configuring the crushable element to provide different crush resistance at different degrees of deformation over a ramp down distance (e.g., increasing crush resistance with increasing loads). Also, because of the stepped shape of the notches 802B and channels 804B, the changes in crush resistance over the ramp down distance may be stepwise changes.

Figure 8C:
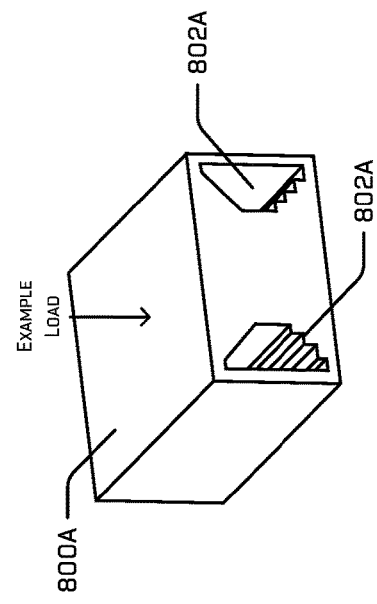

FIG. 8C illustrates an example crushable element 800C comprising a rectangular prism with multiple slots 802C extending through an interior thereof. The slots 802C in this example comprise elongated rectangular slots of varying lengths. The lengths of the slots may be chosen to provide the crushable element 800C with a cross-sectional area that varies over its depth, thereby configuring the crushable element to provide different crush resistance at different degrees of deformation over a ramp down distance (e.g., increasing crush resistance with increasing loads).

Figure 8D:
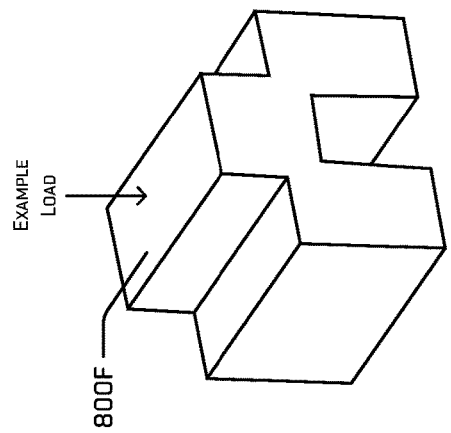

FIG. 8D illustrates an example crushable element 800D comprising a rectangular prism with multiple slots 802D formed at perpendicular angles in one surface thereof. The slots 802D help to minimize area loss, while also allowing parts of the crushable element 800D to break away during compression, which provides initial performance like a solid block, but has a digressive behavior when parts begin to break away. The crushable element 800D may be used in example in which it is desirable to provide a decreasing reaction force over time during the ramp down.

Figure 8E:
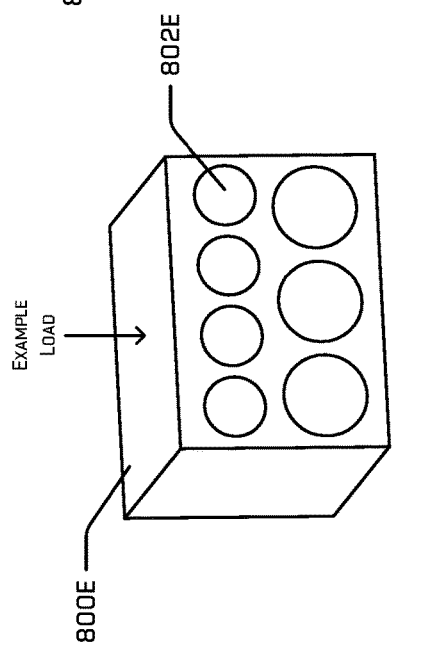

FIG. 8E illustrates an example crushable element 800E including a plurality of through holes 802E formed through an interior thereof and oriented perpendicular to a loading direction. In various examples, the through holes 802E may have round, oval, square, hexagon, S-shape, or other cross-sectional shapes. The through holes 802E may be the same size or different sizes and may be distributed uniformly (e.g., in evenly spaced rows and columns, in a packed arrangement, etc.) or may be disposed in particular locations to achieve a particular localized crush resistance or reaction force tailored to a particular application (e.g., particular seat, vehicle, and/or occupant). The through holes 802E provide a reduced area of material at various depths of the crushable element 800E (therefore reduced crush resistance). The use of round through holes 802E results in a ramping spring like behavior. Increasing the depth to make the through holes 802E oval shaped, results in a crush plateau load, rather than the ramp.

Figure 8F:
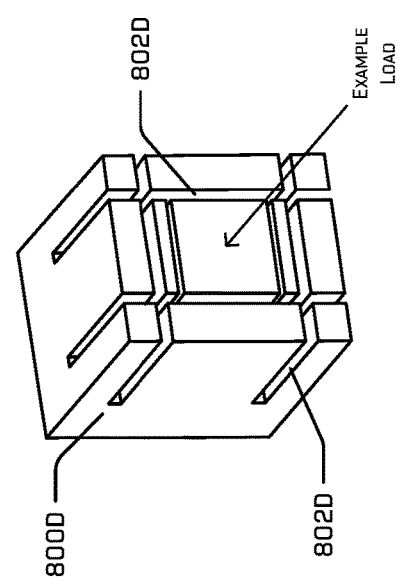

FIG. 8F illustrates an example crushable element 800F having a tooth like section design with a crown and two downwardly protruding legs. The crushable element 800F is configured to break/crack though at the connections of the crown to the legs to allow digressive load curves. The crushable element 800F may be used in example in which it is desirable to provide a decreasing reaction force over time during the ramp down.

Figure 8H:
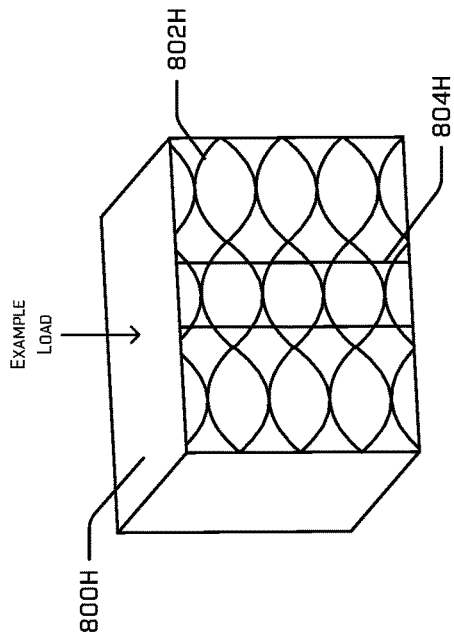
Figure 8J:
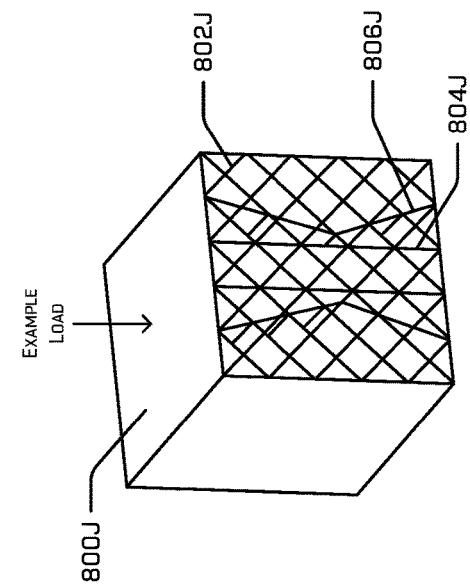
Figure 8G:
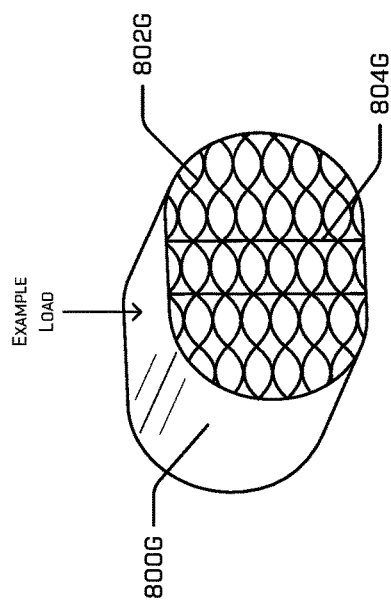

FIG. 8G illustrates an example crushable element 800G having thin-walled cylindrical construction. In this example, the crushable element 800G is shown as having a pill-shape cross-section. However, in other examples, cylindrical crushable elements according to this disclosure may have generally circular, ovoid, elliptical, or other curved cross-sectional shape. An interior of the crushable element 800G includes internal support structures, including a framework of baffles 802G with elongated ribs 804G extending a depth of the crushable element 800G generally aligned with the example load direction. The internal support structures may provide the crushable element 800G with different properties (e.g., rigidity, crush resistance, etc.) in different directions. For example, vertical ribs, such as elongated ribs 804G can be used to get higher initial load resistance before collapsing and relying on other features to provide load resistance after the vertical ribs are unloaded. As another example, vertical ribs extending only partially through the structure allowed delay in load build up. That is, vertical ribs may be provided for only a portion of the depth, such that portions of the crushable element without vertical ribs may begin deforming first at a lower compressive force and the portions of the crushable element having the vertical ribs may begin to deform at a second higher compressive force.

FIG. 8H illustrates an example crushable element 800H in the shape of a rectangular prism having thin-walled construction. The crushable element 800H includes internal support structures, including a framework of baffles 802H with elongated ribs 804H extending a depth of the crushable element 800H generally aligned with the example load direction. In this example the elongated ribs 804H are not aligned with the vertices of the baffles 802H as they were in the previous example, but are rather disposed through an interior portion of one or more of the baffles 802H. As with the previous example, the internal support structures may provide the crushable element 800H with different properties (e.g., rigidity, crush resistance, etc.) in different directions. For example, vertical ribs, such as elongated ribs 804H can be used to get higher initial load resistance before collapsing and relying on other features to provide load resistance and/or vertical ribs extending only partially through the structure allowed delay in load build up.

Figure 8I:
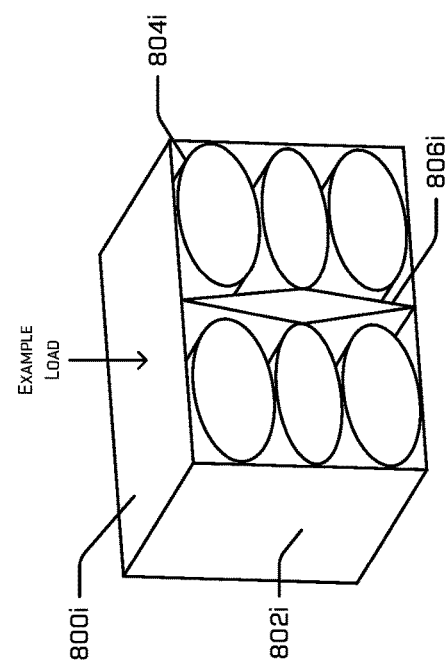

FIG. 8I illustrates another example crushable element 800I in the shape of a rectangular prism having thin-walled construction. The crushable element 800I includes a hollow rectangular outer shell 802I, within which are two stacks of hollow ovoid cylinders 804I separated by a diamond shaped, hollow divider 806I. In this example, the outer shell 802I and the stacks of hollow ovoid cylinders 804I provide crush resistance, while the divider 806I helps to control how the crushable element 800I deforms by causing the crushable element 800I to split in the middle and deform laterally outward during compression.

FIG. 8J illustrates yet another example crushable element 800J in the shape of a rectangular prism having thin-walled construction. The crushable element 800J includes internal support structures, including a framework of perpendicular ribs 802J extending at perpendicular angles to one another, and elongated ribs 804J extending a depth of the crushable element 800J generally aligned with the example load direction. As with previous examples, the internal support structures may provide the crushable element 800J with different properties (e.g., rigidity, crush resistance, etc.) in different directions. For example, vertical ribs, such as elongated ribs 804J can be used to get higher initial load resistance before collapsing and relying on other features to provide load resistance and/or vertical ribs extending only partially through the structure allowed delay in load build up. The crushable element 800J of this example also includes shallow V-shaped ribs 806J that are oriented toward the top and bottom or lateral sides of the crushable element 800J. The V-shaped ribs 806J may provide additional rigidity and/or help to control how the crushable element 800J deforms during compression.

In any of the preceding examples of FIGS. 8A-8J, one or more of the baffles, elongated ribs, or other internal support structures may include buckle initiators to tune the initial buckle of the crush element upon application of a threshold compressive force. Additionally, the structures depicted in FIGS. 8G-J may comprise of thin-walled materials such as, for example, plastic, aluminum, nylon, cellulose based material, or a combination of these and/or other materials, for example, and may or may not be reinforced with fibers or other reinforcing materials. As noted above, the example crushable elements shown in FIGS. 8A-8J are merely illustrative and the size, shape, and configuration may be modified to achieve desired crush characteristics for a particular application. Also, features of the crushable elements shown in FIGS. 8A-8J may be combined with one another and/or with features of any of the other energy absorbers described herein.

Figure 9:
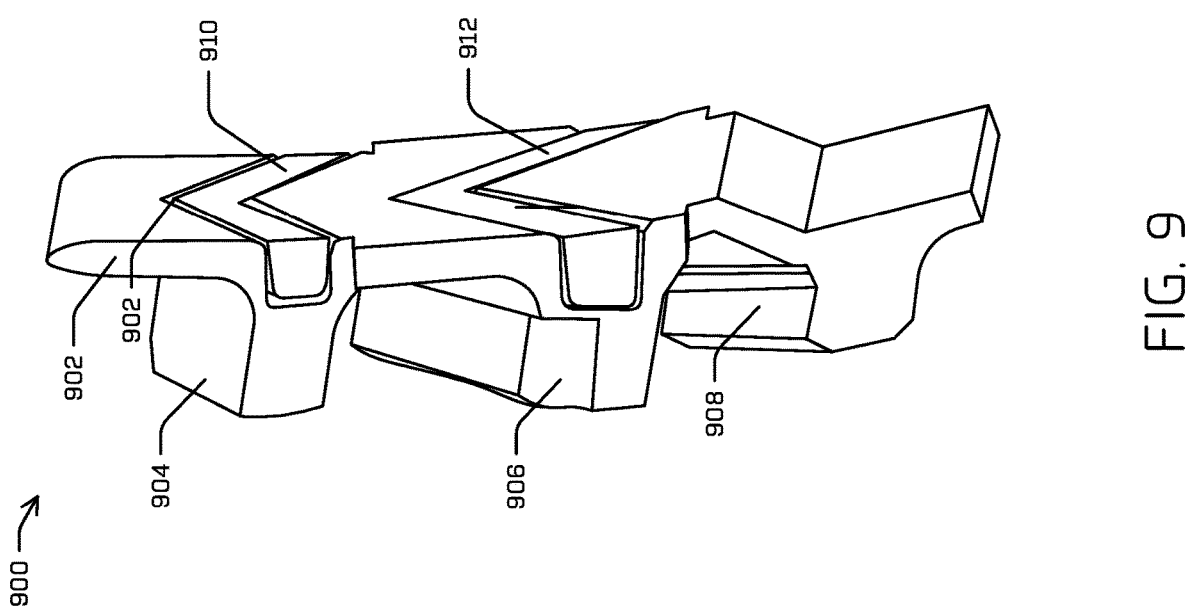
FIG. 9 illustrates a perspective view of another example energy absorber including a backplane, one or more crushable elements, and multiple tubes or channels to tune a deformation behavior of the energy absorber.

FIG. 9 illustrates a perspective view of another example energy absorber 900, which includes multiple voids or tubes at various locations in the structure to tune the compression resistance at certain localized areas of the energy absorber 900. The energy absorber 900 in this example is similar in many respects to energy absorber 126, 200, and/or 600 described above. For instance, the energy absorber 900 in this example includes a backplane 902, a first crushable element 904, a second crushable element 906, and/or a third crushable element 908. As in previous examples, the first crushable element 904, second crushable element 906, and third crushable element 908 are depicted as chevron-shaped. However, as discussed above, in other examples, the crushable element(s) may comprise various different shapes, sizes, and configurations. In some examples, the backplane 902 may have one or more collapsible tubes. For example, the energy absorber may have a first collapsible tube 910 and/or a second collapsible tube 912. However, any number of collapsible tubes may be used. The number of collapsible tubes may be the same as or different than a number of crushable elements. In some examples, the first collapsible tube 910 and/or the second collapsible tube 912 may be disposed within the backplane 902. In some examples, the first collapsible tube 910 and/or the second collapsible tube 912 may be embedded within the backplane 902 such that the depth of the collapsible tube(s) is the same or similar as the depth of the backplane 902. In still other examples, the collapsible tubes may be disposed in, on, or adjacent to one or more of the first crushable element 904, second crushable element 906, and third crushable element 908.

In some examples, the first collapsible tube 910 and/or the second collapsible tube 912 may be disposed within the backplane 902 such that, under a compressive force, the first collapsible tube 910 and/or the second collapsible tube 912 may provide different (e.g., greater or lesser) compression strength than the backplane 902 and/or crushable element(s). Additionally, the first collapsible tube 910 may be made of a same or different material, may have a same or different construction (e.g., wall thickness, dimensions, etc.), and/or may exhibit the same or different compressive strength as the second collapsible tube 912. In some examples, the first collapsible tube 910 and/or the second collapsible tube 912 may demonstrate digressive behavior under compressive forces of a collision. By way of example and not limitation, the first collapsible tube 910 and/or the second collapsible tube 912 may comprise hollow tubes and may be made of plastic (e.g., polypropylene, acrylonitrile butadiene styrene, polystyrene, etc.), metal (e.g., thin walled steel, aluminum, magnesium, etc.), composite material (e.g., fiberglass, carbon fiber, etc.), cellulose material, a combination of these, and/or other materials.

Figure 10:
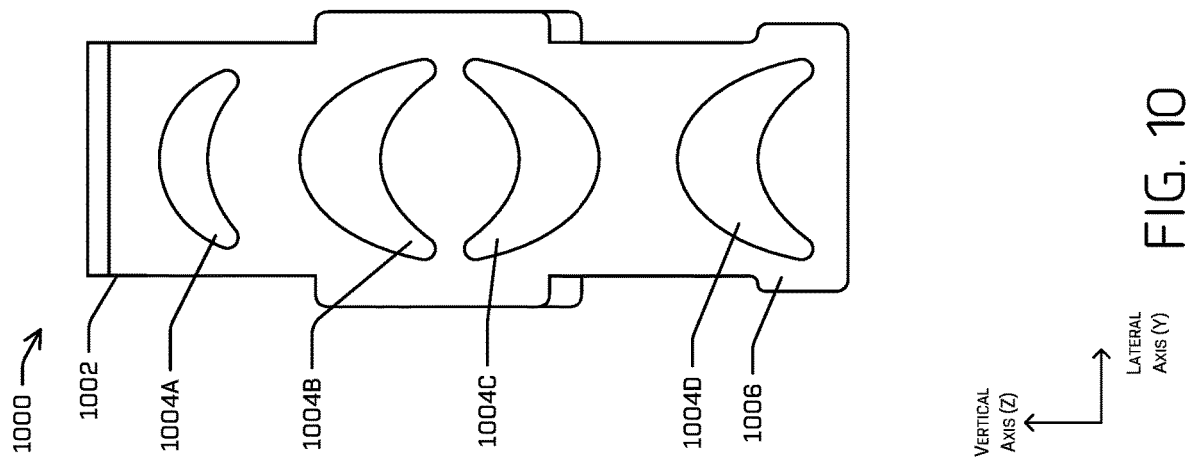
FIG. 10 illustrates a back view of another example energy absorber having holes or voids.

FIG. 10 illustrates a back view of yet another example energy absorber 1000. The energy absorber 1000 includes a crush structure 1002 to plastically deform during a collision. The crush structure 1002 may be made of any of the crushable materials described throughout this application. The crush structure 1002 of this example may or may not include a backplane and one or more individual crushable elements. In this example, the crush structure 1002 includes multiple crushable elements 1004 including a first crushable element 1004A, a second crushable element 1004B, a third crushable element 1004C, and a fourth crushable element 1004D (collectively "crushable elements 1004") in the shape of crescents. The size, shape, number, and location of the crushable elements 1004 may be chosen to configure the energy absorber 1000 to provide the desired crush resistance over a ramp down distance during a collision. In some examples, as depicted in FIG. 10, the crescents 1004 may be orientated such that the ends of the crescent shapes are pointing downwards (as in the case of the first crushable element 1004A, second crushable element 1004B, and fourth crushable element 1004D) or such that the ends of the crescent shapes are pointing upwards (as in the case of the third crushable element 1004C). However, in other examples, any or all of the crushable elements 1004 may be oriented with ends point up, down, laterally outward (e.g., left or right relative to the seat back), or at any other angle. Moreover, the crushable elements 1004 may be oriented at the same or different angles relative to one another. Still further, while four crescent shaped crushable elements 1004 are shown in this example, any number of crushable elements may be used. Similar to the chevron shapes of previous embodiments described herein, the crescent shapes have dimensions in the lateral and vertical directions (perpendicular to the loading direction) sufficient to limit deflection of the crushable elements during a collision. This orientation may cause the energy absorber 1000 to, under a compressive force, compress in the longitudinal direction under a compressive load substantially aligned with the axial direction, while resisting or limiting deflection in the lateral and/or vertical direction. By way of example and not limitation, the crush structure 1002 may be made of a first polymeric foam material and the crescents 1004 may be made of a second polymeric foam material different than the first polymeric foam material. The energy absorber 1000 of this example also includes a pelvic support structure 1006, which may be the same or similar to the pelvic support structures described for other examples. In the illustrated example, the pelvic support structure 1006 is formed integrally with the crush structure 1002 and includes the fourth crushable element 1004D.

Example Clauses

The following paragraphs describe various examples. Any of the examples in this section may be used with any other of the examples in this section and/or any of the other examples or embodiments described herein.

A. In an example, a vehicle comprises: a body having a passenger compartment; and a seat disposed in the passenger compartment, the seat comprising a seatback having a first side to receive an occupant and a second side opposite the first side; an energy absorber disposed between the first side of the seatback and second side of the seatback, the energy absorber comprising: a backplane proximate the first side of the seatback; and a crush structure protruding from the backplane towards the second side of the seatback, wherein, during a collision with an object on the second side of the seatback, the crush structure is configured to plastically deform in an axial direction substantially parallel to a longitudinal axis of the vehicle and to limit deflection of the crush structure in lateral and vertical directions of the vehicle.

B. The vehicle of example A, wherein the crush structure comprises multiple crushable elements, and wherein at least one crushable element of the multiple crushable elements has a cross-section having: a height of at least 15 millimeters; and a width of at least 40 millimeters.

C. The vehicle of any one of examples A or B, wherein the crush structure comprises multiple crushable elements, and a combined cross-sectional area of the multiple crushable elements is at least 45 centimeters.

D. The vehicle of any one of examples A-C, the crush structure comprises a first crushable element having a first shape and a second crushable element having a second shape which is different than the first shape.

E. The vehicle of any one of examples A-D, wherein the crush structure comprises a material having a compression strength of between about 200 kilopascals and about 600 kilopascals.

F. The vehicle of any one of examples A-D, wherein the crush structure comprises one or more crushable elements, at least one of which having at least a portion of a cross-section in the shape of a chevron.

G. The vehicle of any one of examples A-F, wherein the crush structure comprises a plastically deformable, polymeric foam having a density of at most 40 grams per liter and a compression strength of at least 300 kilopascals at 60 degrees Celsius and at most 500 kilopascals at −15 degrees Celsius.

H. The vehicle of any one of examples A-G, the vehicle further comprising a crushable pelvic support structure configured to plastically deform during the collision, the crushable pelvic support structure disposed between the first side of the seatback and the second side of the seatback and below the crush structure.

I. The vehicle of example H, wherein the crushable pelvic support structure comprises a plastically deformable material having a compression strength of between about 200 kilopascals and about 600 kilopascals.

J. The vehicle of any one of examples A-I, wherein the crush structure has a depth of at least about 100 millimeters and at most about 210 millimeters.

K. The vehicle of any one of examples A-J, wherein a crushable element of the crush structure has a stepped shape profile, such that the crushable element has a first thickness proximal to the backplane and a second thickness distal from the backplane, the second thickness being less than the first thickness.

L. The vehicle of any one of examples A-K, wherein the vehicle is a bidirectional vehicle and the seat comprises a first seat, the vehicle further comprising a second seat that includes a seatback assembly having a first side to receive an occupant and a second side opposite the first side, the second seat being carriage facing.

M. In an example, a seat comprises: a seatback having a first side to receive an occupant and a second side opposite the first side, the seatback comprising an energy absorber disposed between the first side and second side, the energy absorber comprising: a backplane proximate the first side of the seatback; and a crush structure protruding from the backplane towards the second side of the seatback, wherein, during a collision with an object on the second side of the seatback, the crush structure is configured to plastically deform in an axial direction substantially parallel to a direction in which the crush structure protrudes from the backplane and to limit deflection of the crush structure in directions other than the axial direction.

N. The seat of example M, wherein: the crush structure comprises multiple crushable elements; at least one crushable element of the multiple crushable elements has a cross-section having: a height of at least 15 millimeters; and a width of at least 40 millimeters; and a combined cross-sectional area of the multiple crushable elements is at least 45 centimeters.

O. The seat of any one of examples M or N, wherein the crush structure comprises a first crushable element having a first shape and a second crushable element having a second shape which is different than the first shape.

P. The seat of any one of examples M-O, wherein the crush structure comprises a material having a compression strength of between about 200 kilopascals and about 600 kilopascals.

Q. The seat of any one of examples M-P, wherein the crush structure comprises one or more crushable elements, at least one of which having at least a portion of a cross-section in the shape of a chevron.

R. The seat of any one of examples M-Q, wherein the crush structure comprises a plastically deformable, polymeric foam having a density of at most 40 grams per liter and a compression strength of at least 300 kilopascals at 60 degrees Celsius and at most 500 kilopascals at −15 degrees Celsius.

S. The seat of any one of examples M-R, the seat further comprising a crushable pelvic support structure configured to plastically deform during the collision, the crushable pelvic support structure disposed between the first side of the seatback and the second side of the seatback and below the crush structure.

T. In an example, an energy absorber comprises: a backplane comprising a substantially planar backplane of material having a first side and a second side; and a crush structure comprising a plastically deformable material, the crush structure protruding from the second side of the backplane in a protruding direction, wherein, during a collision with an object on the second side of the backplane, the crush structure is configured to plastically deform along a deformation axis which is substantially parallel to the protruding direction in which the crush structure protrudes from the backplane and to limit deflection of the crush structure in directions other than the deformation axis.

U. The energy absorber of example T, wherein: the crush structure comprises multiple crushable elements; at least one crushable element of the multiple crushable elements has a cross-section having: a height of at least 15 millimeters; a width of at least 40 millimeters; a depth of at least about 100 millimeters and at most about 210 millimeters; and a combined cross-sectional area of the multiple crushable elements is at least 45 centimeters.

V. The energy absorber of any one of examples T or U, wherein the crush structure comprises a material having a compression strength of between about 200 kilopascals and about 600 kilopascals.

W. The energy absorber of any one of examples T-V, wherein the crush structure comprises one or more crushable elements, at least one of which having at least a portion of a cross-section in the shape of a chevron.

X. The energy absorber of any one of examples T-W, the energy absorber further comprising a crushable pelvic support structure configured to plastically deform during the collision, the crushable pelvic support structure disposed below the crush structure.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples have been described herein, various alterations, additions, permutations and equivalents thereof are included within the scope of this disclosure.

In the detailed description, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the claimed subject matter. While certain operations are described in a certain order, in some cases the ordering can be changed so that certain inputs are provided at different times or in a different order without changing the function of the systems and methods described.

What is claimed is:

1. A vehicle comprising:
   a body having a passenger compartment;
   a seat disposed in the passenger compartment, the seat comprising a seatback having a first side to receive an occupant and a second side opposite the first side; and
   an energy absorber disposed between the first side of the seatback and the second side of the seatback, the energy absorber comprising:
   a backplane proximate the first side of the seatback; and
   a crush structure protruding from the backplane towards the second side of the seatback, the crush structure comprising a crushable element having a first arm with a first end and a second end, and a second arm with a third end and a fourth end, wherein the second end and the third end meet at a first point and the first end and the fourth end are each at a respective different point different from each other and the first point, and wherein the first arm and second arm are oblique to one another, and wherein, during a collision with an object on the second side of the seatback, the crush structure is configured to plastically deform in an axial direction substantially parallel to a longitudinal axis of the vehicle and to limit deflection of the crush structure in lateral and vertical directions of the vehicle.

2. The vehicle of claim 1, wherein the crushable element is one of multiple crushable elements, and wherein at least one crushable element of the multiple crushable elements has a cross-section having:
   a height of at least 15 millimeters; and
   a width of at least 40 millimeters.

3. The vehicle of claim 1, wherein the crushable element is one of multiple crushable elements, and a combined cross-sectional area of the multiple crushable elements is at least 45 centimeters$^2$.

4. The vehicle of claim 1, wherein the crushable element is a first crushable element having a first shape, and wherein the crush structure further comprises a second crushable element having a second shape which is different than the first shape.

5. The vehicle of claim 1, wherein the crush structure comprises a material having a compression strength of between about 200 kilopascals and about 600 kilopascals.

6. The vehicle of claim 1, wherein the crushable element is one of multiple crushable elements, at least one of which having at least a portion of a cross-section in a shape of a chevron or a crescent.

7. The vehicle of claim 1, wherein the crush structure comprises a plastically deformable, polymeric foam having a density of at most 40 grams per liter and a compression strength of at least 300 kilopascals at 60 degrees Celsius and at most 500 kilopascals at −15 degrees Celsius.

8. The vehicle of claim 1, the vehicle further comprising a crushable pelvic support structure configured to plastically deform during the collision, the crushable pelvic support structure disposed between the first side of the seatback and the second side of the seatback and below the crush structure.

9. A seat comprising:
a seatback having a first side to receive an occupant and a second side opposite the first side, the seatback comprising an energy absorber disposed between the first side and the second side, the energy absorber comprising:
a backplane proximate the first side of the seatback; and
a crush structure protruding from the backplane towards the second side of the seatback, the crush structure comprising a crushable element having a first arm with a first end and a second end, and a second arm with a third end and a fourth end, wherein the second end and the third end meet at a first point and the first end and the fourth end are each at a respective different point different from each other and the first point, and wherein the first arm and second arm are oblique to one another, and
wherein, during a collision with an object on the second side of the seatback, the crush structure is configured to plastically deform in an axial direction substantially parallel to a direction in which the crush structure protrudes from the backplane and to limit deflection of the crush structure in directions other than the axial direction.

10. The seat of claim 9, wherein:
the crushable element is one of multiple crushable elements;
at least one crushable element of the multiple crushable elements has a cross-section having:
a height of at least 15 millimeters; and
a width of at least 40 millimeters; and
a combined cross-sectional area of the multiple crushable elements is at least 45 centimeters$^2$.

11. The seat of claim 9, wherein the crushable element is a first crushable element having a first shape, and wherein the crush structure further comprises a second crushable element having a second shape which is different than the first shape.

12. The seat of claim 9, wherein the crush structure comprises a material having a compression strength of between about 200 kilopascals and about 600 kilopascals.

13. The seat of claim 9, wherein the crushable element is one of multiple crushable elements, at least one of which having at least a portion of a cross-section in a shape of a chevron or a crescent.

14. The seat of claim 9, wherein the crush structure comprises a plastically deformable, polymeric foam having a density of at most 40 grams per liter and a compression strength of at least 300 kilopascals at 60 degrees Celsius and at most 500 kilopascals at −15 degrees Celsius.

15. The seat of claim 9, the seat further comprising a crushable pelvic support structure configured to plastically deform during the collision, the crushable pelvic support structure disposed between the first side of the seatback and the second side of the seatback and below the crush structure.

16. An energy absorber comprising:
a backplane comprising a substantially planar sheet of material having a first side and a second side opposite the first side, wherein the energy absorber is configured to be disposed in a seat with the first side of the backplane proximate to an occupant seating surface of the seat; and
a crush structure comprising a plastically deformable material, the crush structure protruding from the second side of the backplane in a protruding direction, the crush structure comprising a crushable element having a first arm with a first end and a second end, and a second arm with a third end and a fourth end, wherein the second end and the third end meet at a first point and the first end and the fourth end are each at a respective different point different from each other and the first point, and wherein the first arm and second arm are oblique to one another, and
wherein, during a collision with an object on the second side of the backplane, the crush structure is configured to plastically deform along a deformation axis which is substantially parallel to the protruding direction in which the crush structure protrudes from the backplane and to limit deflection of the crush structure in directions other than the deformation axis.

17. The energy absorber of claim 16, wherein:
the crushable element is one of multiple crushable elements;
at least one crushable element of the multiple crushable elements has a cross-section having:
a height of at least 15 millimeters;
a width of at least 40 millimeters; and
a depth of at least about 100 millimeters and at most about 210 millimeters; and
a combined cross-sectional area of the multiple crushable elements is at least 45 centimeters$^2$.

18. The energy absorber of claim 16, wherein the crush structure comprises a material having a compression strength of between about 200 kilopascals and about 600 kilopascals.

19. The energy absorber of claim 16, wherein the crushable element is one of multiple crushable elements, at least one of which having at least a portion of a cross-section in a shape of a chevron or a crescent.

20. The energy absorber of claim 16, the energy absorber further comprising a crushable pelvic support structure configured to plastically deform during the collision, the crushable pelvic support structure disposed below the crush structure.

* * * * *